United States Patent [19]
Ennis

[11] 3,816,869
[45] June 18, 1974

[54] VEHICLE OVERHEAD WASHING APPARATUS
[76] Inventor: George Thomas Ennis, 1354 E. State St., Sharon, Pa.
[22] Filed: Apr. 4, 1973
[21] Appl. No.: 347,554

[52] U.S. Cl. .............................. 15/21 D, 15/DIG. 2
[51] Int. Cl. ............................................ B60s 3/06
[58] Field of Search............ 15/DIG. 2, 21 D, 21 E, 15/53

[56] References Cited
UNITED STATES PATENTS
3,731,332   5/1973   Bernardi............................ 15/21 E
FOREIGN PATENTS OR APPLICATIONS
497,422   11/1953   Canada........................... 15/DIG. 2

Primary Examiner—Edward L. Roberts
Attorney, Agent, or Firm—Schuyler, Birch, Swindler, Mckie & Beckett

[57] ABSTRACT

Apparatus for washing the upward facing surfaces of a vehicle, including a power driven rotary brush assembly which has a horizontal axis and is carried by a pivoted overhead assembly whereby the brush assembly may pivot upwardly to permit the vehicle to pass underneath while the brush engages and washes the upward facing surfaces of the vehicle. The brush carrying assembly includes a pair of brush carrying arms pivotally attached to support members and a pair of counterbalancing arms extending away from the pivot points in a direction generally opposite the direction of extension of the brush carrying arms. One of the counterbalancing arms is provided with a mechanism which is adapted to provide a variable counterbalancing force such that the downward force on the brush is made maximal when the arm and brush are in a lowered rest positon and is made minimal when the arm and brush are in a raised position.

8 Claims, 7 Drawing Figures

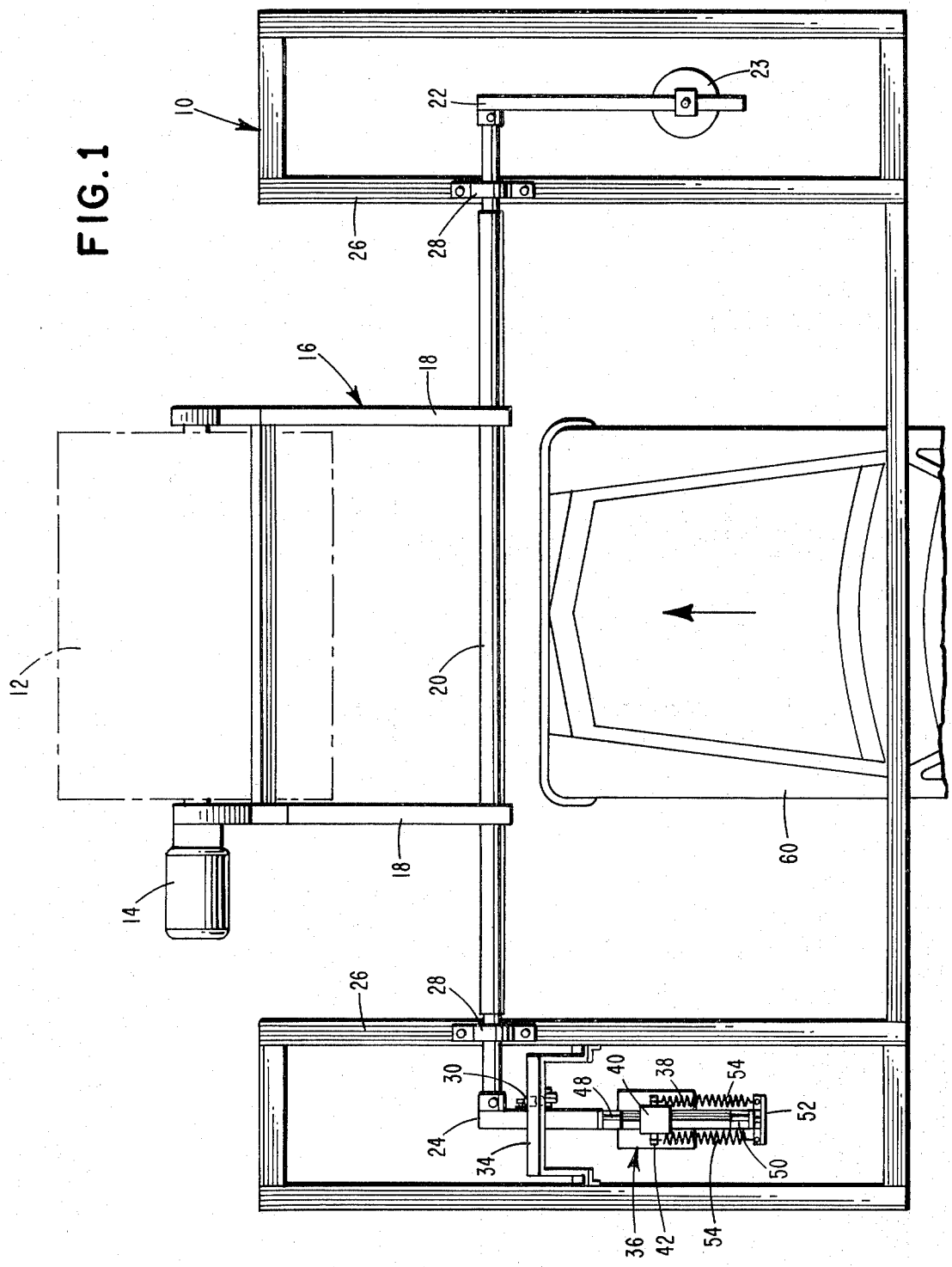

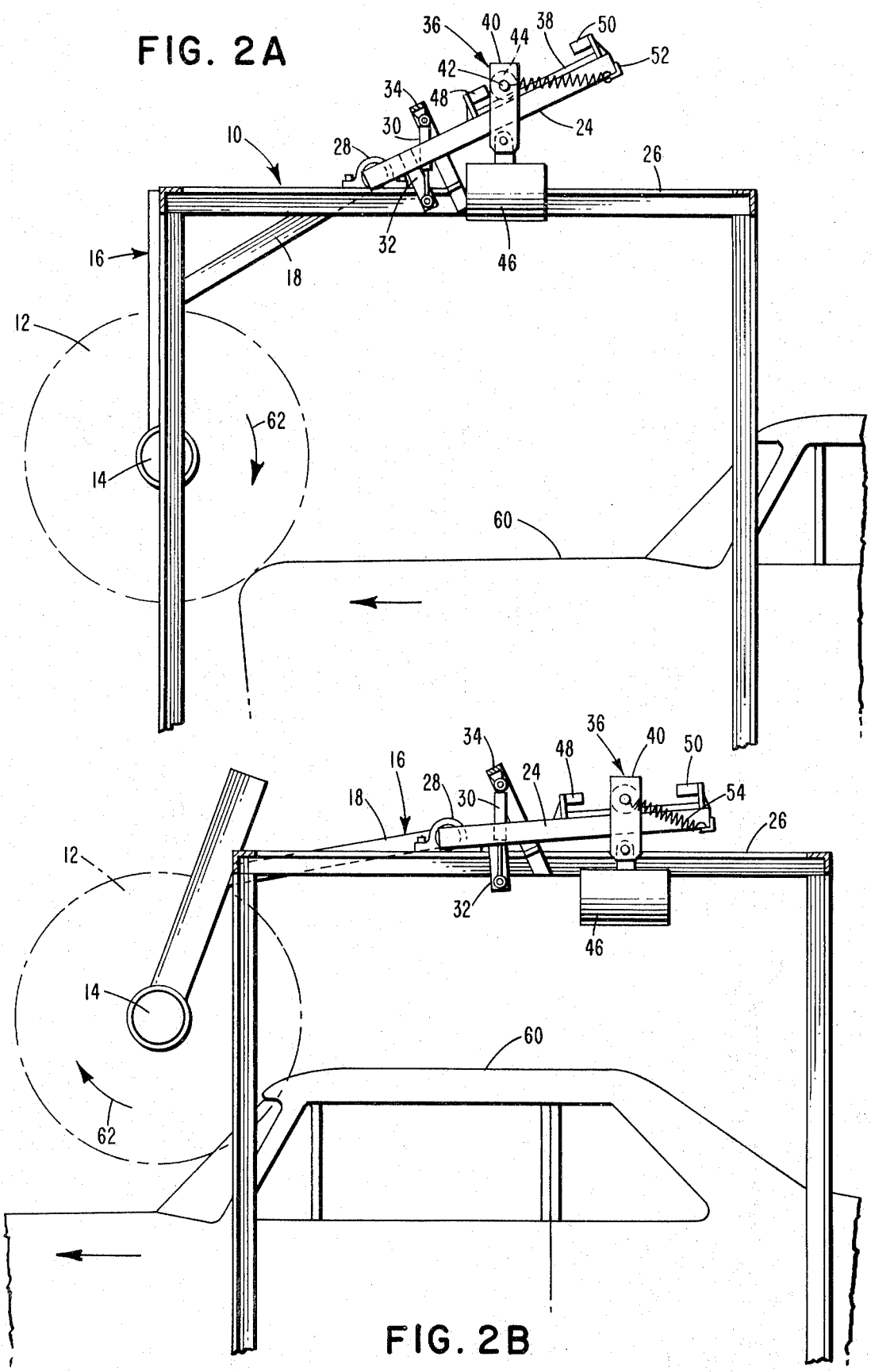

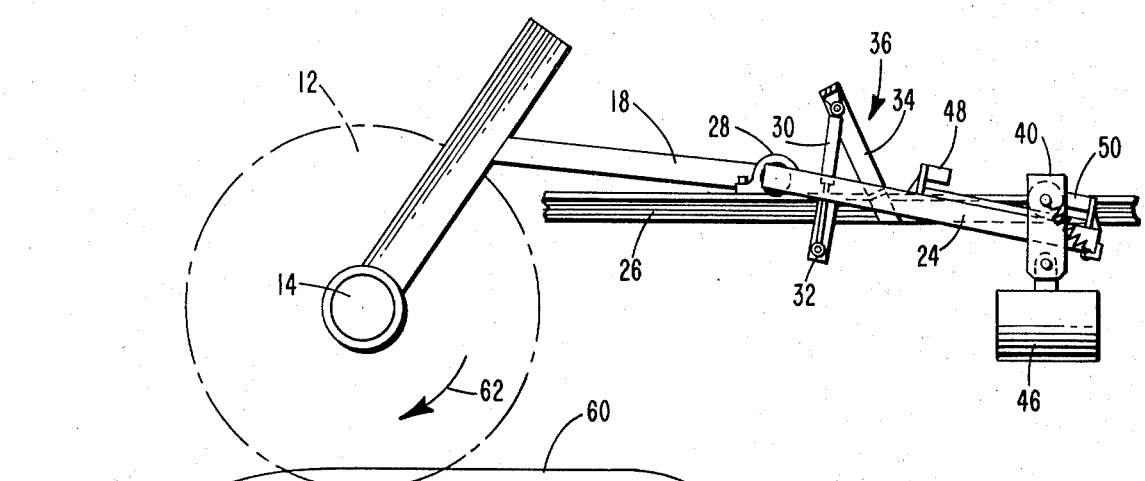
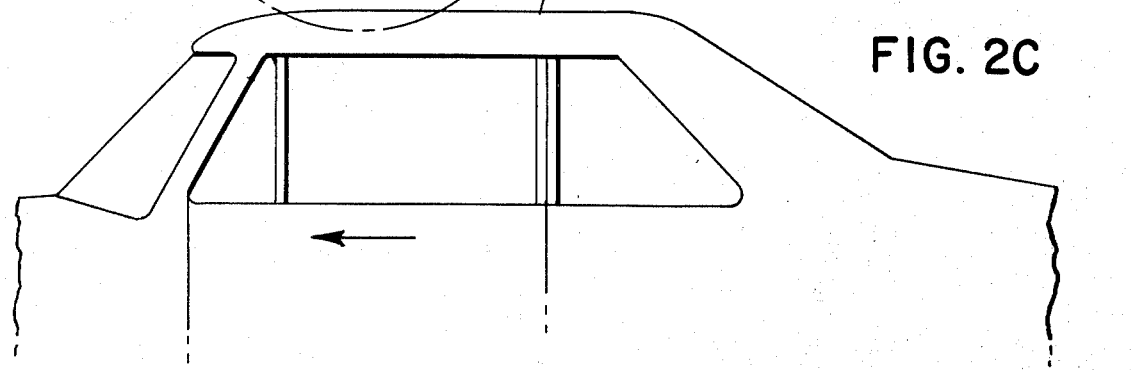
FIG. 2C
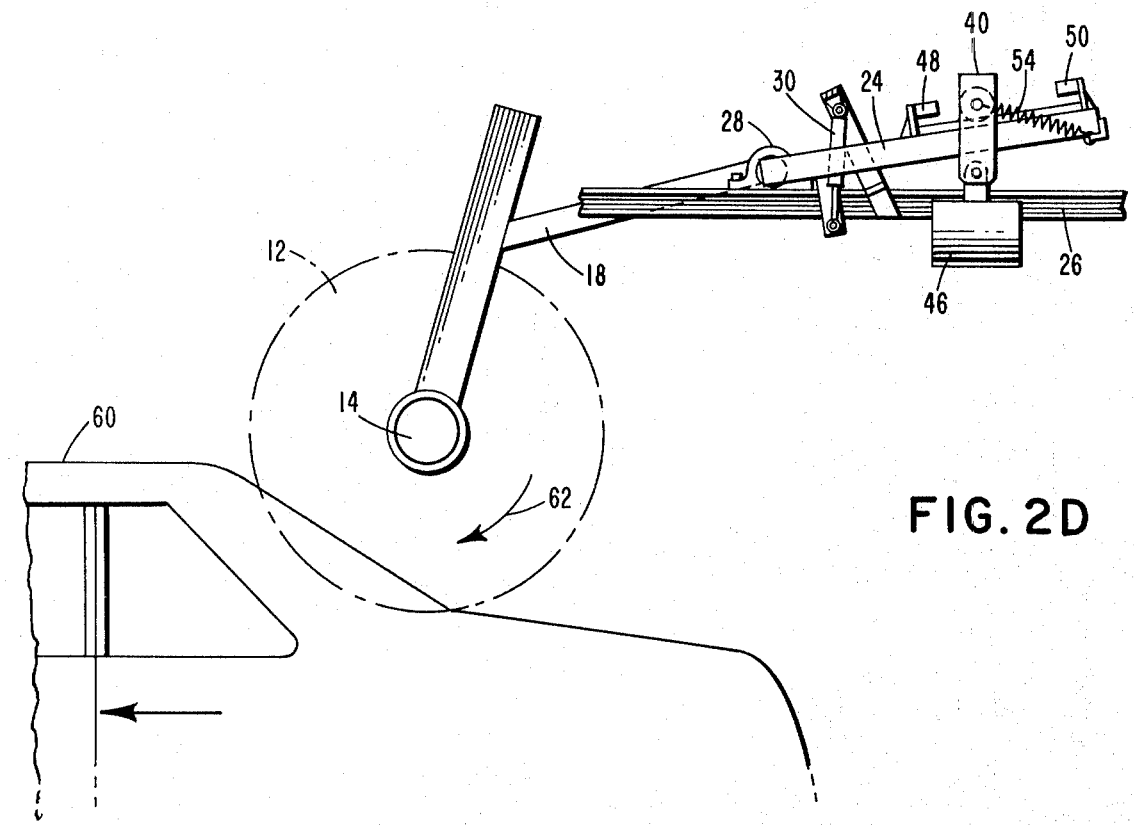
FIG. 2D

VEHICLE OVERHEAD WASHING APPARATUS

BACKGROUND OF THE INVENTION

FIELD OF THE INVENTION

This invention relates generally to vehicle washing apparatus and, more particularly, to a vehicle washing apparatus employing an overhead rotating brush assembly for automatically cleaning the upward facing surfaces of a vehicle.

Numerous devices employing overhead rotary brush assemblies for cleaning the upward facing surfaces of vehicles have been available in the past. Many such prior art devices, however, have been objectionable in that they have been complicated in construction, requiring the use of extensive power actuated control means to effect the proper movement and lifting of the brush supporting arms to effectively clean the upper surfaces of the vehicle. The power actuated control means are susceptible to failure and can cause damage to vehicles upon such failure. Consequently, such devices have often required close supervision and extensive maintenance and adjustment, thus making them expensive to construct, operate and maintain.

Other vehicle washing devices have employed brushes supported for upward movement on vertical tracks and counterbalanced by a system of weights, cables and pulleys. Such devices have tended to catch on the substantially vertical surfaces at the front of some automobiles, vans and other vehicles, thereby causing damage either to the vehicle or to the washing device. Still other vehicle washing devices have employed brushes supported by pivoted overhead arms which are counterbalanced by weights whose position may be adjusted but which remain substantially fixed during the pivoting movement of the arm, thus causing the brush to have a constant downward force at all times. This constant force is disadvantageous because the downward force necessary to hold the brush in sufficient engagement with the front surfaces of the vehicle to provide adequate cleaning results in the pressure exerted on the roof on the vehicle by the cleaning brush being so great as to cause damage.

SUMMARY OF THE INVENTION

Among the objects of the present invention is the avoidance of the disadvantages of prior art vehicle washing devices enumerated above. Another object of the present invention is to provide a vehicle washing apparatus which is simple in construction, thus providing an inexpensive and efficient unit which requires minimal maintenance and attention during operation.

It is a further object of this invention to provide a vehicle washing apparatus which does not require extensive power actuated control means to effect lifting and movement of the overhead rotary brush assembly.

It is a still further object of this invention to provide a vehicle washing apparatus having an overhead, horizontal axis rotary brush assembly which uses simple mechanical counterbalancing means to vary the downward force exerted by the brush against the vehicle as the vehicle is washed.

According to the present invention there is provided a vehicle washing apparatus in which a rotatable brush means having a substantially horizontal axis is carried by an arm pivotally attached at one end to support means, the arm being rotatable about the pivot axis between an initial rest position with the arm extending downwardly and a raised position with the arm and brush raised to a height sufficient to permit a vehicle to pass therebeneath. A counterbalancing arm is attached to the brush carrying arm adjacent the pivot axis and extending from said pivot axis in a direction generally away from that of said brush carrying arm. Associated with this counterbalancing arm are means for providing variable counterbalancing force such that the downward force on said brush means is made maximal when said brush carrying arm is in the aforementioned rest position and is made minimal when said brush carrying arm is in a raised position.

BRIEF DESCRIPTION OF THE DRAWING

Other objects and advantages of the invention will become apparent by reference to the more detailed description of the invention and the accompanying drawings which follow, wherein:

FIG. 1 is a plan view of the vehicle washing apparatus of this invention.

FIGS. 2A – 2E are side elevations of the apparatus of FIG. 1, illustrating the positions of the various components during the operation of the apparatus.

DESCRIPTION OF THE INVENTION

Figure 2E:
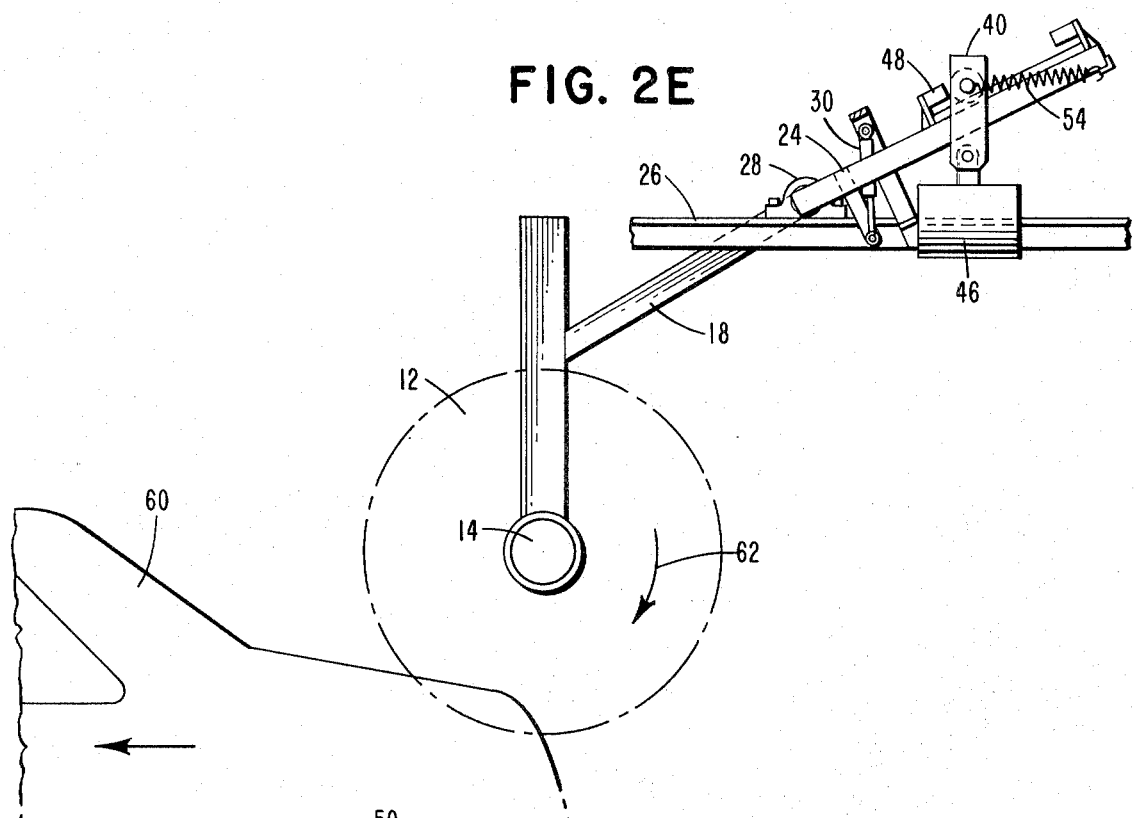

Referring to the drawings, FIGS. 1 and 2A – 2E show a vehicle washing apparatus 10 according to the present invention, comprising a rotary brush 12 driven by suitable motor means 14 and carried by supporting arm assembly 16. This supporting arm assembly 16 includes brush supports 18 fixed to pivot shaft 20, to which are attached counterbalance arms 22 and 24. The brush assembly and its supporting arm assembly are carried by the main framework 26 of the vehicle washing apparatus by means of attached bearing blocks 28, through which the outer portions of pivot shaft 20 project.

A counterweight 23 is adjustably positionable along arm 22 to provide for partial counterbalancing of the downward force exerted by brush assembly 12.

A damping unit 30 is attached between arm 24 and the framework 26 by means of suitable brackets 32 and 34 respectively. The purpose of this unit is to damp abrupt movements of the arm 24 and thus provide for smooth movement of the brush assembly.

Figure 3:
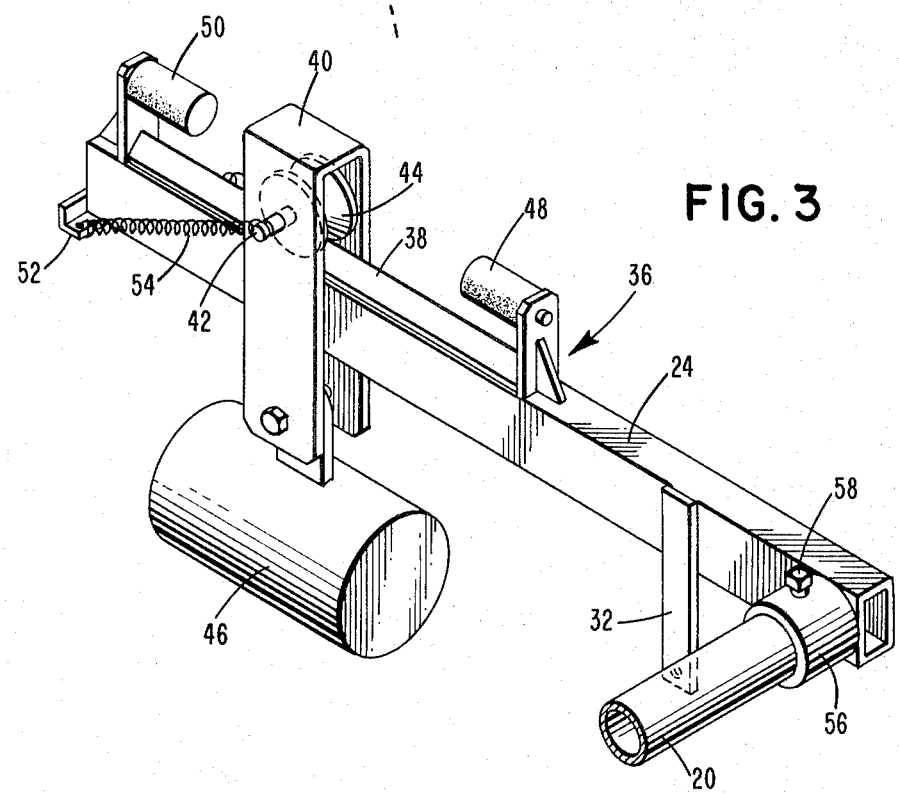
FIG. 3 is a perspective view of the counterbalancing arm of the apparatus of FIG. 1.

Also mounted on arm 24 is a traveling counterweight assembly generally indicated by reference number 36 and shown in greater detail in FIG. 3. The traveling counterweight assembly 36 includes a track 38, preferably in the form of an inverted angle extrusion. This track is adapted to carry a counterweight trolley comprising a housing 40 to which is attached shaft 42, carrying roller 44 within the housing 40. The roller 44 is preferably a V-roller adapted for rolling engagement with the track 38. A counterweight 46 is suspended from the housing 40 below the arm 24. The range of travel of the trolley assembly along the track 38 is restrained by bumpers 48 and 50 located at the ends of the track toward the pivot point and toward the outward end of arm 24 respectively. Spring mounting bracket 52 is fixed to the outward end of arm 24. Counterweight springs 54 are attached between bracket 52 and the ends of the roller shaft 42 which project beyond the housing 40 of the trolley assembly. Springs 54 are tension springs adapted to bias the trolley assembly toward the outer bumper 50 in a manner described hereafter.

Arm 24 is attached to pivot shaft 20 by clamping means fixed to shaft 24. This clamping means includes a boss 56 rigidly fixed to arm 24 and having a bore suitable for insertion of the outer portion of shaft 20 and a fixing means 58, preferably in the form of a set screw or bolt adapted to be tightened against the shaft 20 inserted within the bore of boss 56. This clamping means permits adjustment of the angle between arm 24 and brush supports 18, for purposes described hereafter.

The operation of the vehicle washing apparatus of the present invention is best understood by reference to FIGS. 2A–2E. In FIG. 2A, the brush supporting assembly is shown in its initial rest position just prior to engaging the front of a vehicle 60 to be washed. In this position the rotary brush assembly is in its lowermost position, further downward movement being prevented by the fully compressed condition of the damper unit 30, thus permitting no further pivoting of the arm 24. The rotary brush 12 shown in FIG. 2A rotates in the clockwise direction indicated by the arrow 62. As the vehicle 60 advances through the vehicle washing apparatus, from right to left in the direction of the arrow in FIG. 2A, the counterbalanced brush assembly will engage first the upper front portions of the automobile, such as the hood, and will clean the upper surface of the hood and front fenders of the vehicle. In this position the weight of counterweight 46 and the angle of track 38 upon which the counterweight supporting trolley is carried provide a resulting force along the track 38 sufficient to urge the counterweight toward bumper 48 with enough force to overcome the biasing force of springs 54. The springs 54 are extended and the trolley assembly rests against stop 48. In this position maximum downward force is provided the brush assembly 12 to insure adequate contact with the forwardmost portions of the vehicle 60 for proper washing thereof.

As the vehicle 60 continues to advance through the washing apparatus, from right to left in FIGS. 2A–2E, the rotary brush assembly 12 next engages the upward projecting windshield of the vehicle. By virtue of the upward projection of the windshield, and aided by the rotation of the brush, the brush assembly moves upwardly. This upward movement of the brush assembly 12 causes the supporting assembly 16 to pivot within bearing blocks 28, thus reducing the angle of upward projection of arm 24 and bringing such arm toward a horizontal position. As the angle of upward projection is reduced, the force caused by counterweight 46 acting along the inclined track 38 is likewise reduced such that springs 54 are now able to move the trolley assembly toward bumper 50. As the trolley assembly is moved from its position against bumper 48 outwardly along arm 24 toward bumper 50, the distance or moment arm between counterweight 46 and bearing block 28 is increased. Consequently, the counterbalancing moment created by counterweight 46 is increased relative to that of brush assembly 12, thus reducing the downward force of the brush assembly 12 on the vehicle. The clamping means attaching arm 24 to shaft 20 permits adjustment of the angle between arm 24 and brush supports 18 such that the point in the upward movement of brush 12 at which the trolley assembly begins increasing the counterbalancing moment may be easily adjusted to obtain the most desirable performance characteristics.

As the vehicle 60 progresses through the vehicle washing apparatus, the brush assembly 12 is brought into contact with the roof of the vehicle, thus raising the brush assembly 12 to its highest point during the washing procedure as shown in FIG. 2C. At this point, arm 24 has been pivoted to a position in which its outward end, away from the pivot, is in a downwardly extending position, the exact angle of downward projection being dependent upon the height of the vehicle. In this position the counterweight 46 and its trolley are moved to a position against outer bumper 50, by virtue of both the force of the counterweight 46 acting on the inclined track 38 and the action of the springs 54. In this posture the counterweight 46 is moved to its outermost position with respect to the pivot arm 20 and thus provides its maximum possible counterbalancing force with respect to brush assembly 12, such that the force exerted by brush assembly 12 against the roof of the vehicle 62 is substantially less than the force exerted by the brush 12 against the vehicle when in the position of FIG. 2A. This reduced force is highly desirable since the maximum force is necessary only to insure sufficient initial contacting force with the vehicle (FIG. 2A) and is neither required nor desired once smooth and adequate contact has been established. By virtue of the apparatus of this invention the contacting force exerted on the roof and other surfaces of the car is no greater than necesssary to provide adequate washing of the vehicle and is substantially less than the initial contacting force exerted when the brush assembly is in its rest position.

As the vehicle 60 continues through the washing apparatus, as shown in FIG. 2D, the brush assembly 12 moves from the upper surfaces of the roof down the rear surfaces of the roof and the rear window of the vehicle. As the brush begins its downward movement, the arm 24 is caused to pivot to a position with its outward end extending upwardly again, such that the force of the counterweight 46 acting along the inclined track 38 again begins to overcome the biasing force of the springs 54, thus causing the counterweight 46 and its trolley assembly to move away from bumper 50 toward bumper 48. This movement of the counterweight 46 reduces the moment arm upon which the counterweight force acts, thus reducing the counterbalancing moment acting against the brush assembly 12. As this counterbalancing moment is reduced, the downward force exerted by brush 12 on vehicle is increased and insures that brush 12 maintains sufficient contact against these rear portions of the vehicle to provide adequate washing thereof. As the vehicle 60 passes beyond the washing apparatus (FIG. 2E), the brush assembly pivots back to the initial rest position of FIG. 2A, the extent of pivoting being restrained by the limit of compression of the damping unit 30. In this position the maximum downward force is again available for brush 12 to engage the front portions of the next vehicle to be washed.

The advantages of the present invention are readily apparent from the foregoing description. The use of weights and simple mechanical counterbalancing linkages permit the construction of a washing apparatus which is not only economical but also extremely rugged and reliable. The variable counterbalancing force reduces the pressure exerted by the washing brush on the upper surfaces of the vehicle, thereby reducing the potential for damage of either the vehicle or the washing apparatus, while at the same time providing for adequate force to permit good initial contact and proper washing action of all portions of the vehicle.

Although the present invention has been illustrated and described in reference to a specific embodiment, it will be understood that various modifications may be made by persons skilled in the art without departing from the spirit of the invention. For example, the traveling counterweight feature might be provided on both of the counterbalancing arms of the apparatus, or alternatively, the brush assembly might be cantilevered and supported by a single counterbalance arm. It should be further understood that the invention is not to be limited by the described embodiment but solely by the appended claims.

I claim:

1. A vehicle washing apparatus comprising
   a support means;
   a rotatable brush means having a substantially horizontal axis;
   an arm pivotally attached at one end to said support means and adapted to carry said brush means, said arm being rotatable about the pivot axis between an initial rest position wherein said arm extends downwardly and a raised position wherein said arm and brush means are raised to a height sufficient to permit a vehicle to pass underneath;
   a counterbalancing arm attached to said brush carrying arm adjacent said pivot axis and extending from said pivot axis in a direction generally away from that of said brush carrying arm; and
   means for providing a variable counterbalancing force on said counterbalancing arm whereby the downward force on said brush means is made maximal when said arm is in said rest position and is made minimal when said arm is in said raised position.

2. A vehicle washing apparatus according to claim 1 further comprising damping means connected between said counterbalancing arm and said support means whereby sudden movement of said arm may be damped.

3. A vehicle washing apparatus according to claim 1 wherein said counterbalancing means is adapted to provide automatically variable counterbalancing force depending upon the position of said counterbalancing arm.

4. A vehicle washing apparatus according to claim 1 wherein the means attaching said counterbalancing arm to said brush carrying arm includes means for adjusting the angular relationship between said counterbalancing arm and said brush carrying arm about said pivot axis.

5. A vehicle washing apparatus according to claim 1 wherein said counterbalancing means is provided with biasing means adapted to urge said counterbalancing means toward the condition of minimum downward force on said brush means.

6. A vehicle washing apparatus according to claim 1 wherein said counterbalancing means comprises a movable weight, whereby said variable counterbalancing force is effected by varying the distance of said weight from said pivot point, thus varying the counterbalancing moment about said pivot point.

7. A vehicle washing apparatus according to claim 6 wherein said movable weight is supported by a wheeled carriage carried in rolling contact by said counterbalancing arm and movable longitudinally of said arm between two travel limit stops.

8. A vehicle washing apparatus comprising
   a supporting frame;
   a rotatable brush means having a substantially horizontal axis;
   an arm pivotally attached at one end to said supporting frame and adapted to carry said brush means, said arm being rotatable about its pivot axis between an initial rest position wherein said arm extends downwardly and a raised position wherein said arm and brush means are raised to a height sufficient to permit a vehicle to pass underneath;
   a counterbalancing arm attached to said brush carrying arm adjacent said pivot axis and extending from said pivot axis in a direction generally away from the direction of said brush carrying arm;
   means for providing a variable counterbalancing force on said counterbalancing arm, said means comprising
   a counterweight carried by said counterbalancing arm and supported by a wheeled carriage carried in rolling contact with said counterbalancing arm and movable longitudinally of said arm between two travel limit stops, one stop being located adjacent the end of said arm away from said arm attachment and the other stop being located proximal said attachment, and
   biasing means attached to said counterbalancing arm and adapted to urge said counterweight toward said one stop, the strength of said biasing means being such that said counterweight is moved away from said other stop and toward said one stop when said brush means is raised from said rest position and said counterbalancing arm is correspondingly lowered, whereby the moment counterbalancing said brush means is increased by the outward movement of the counterweight along said counterbalancing arm thereby reducing the downward force on said brush means as it is raised to clean the upper surfaces of the vehicle; and
   damping means connected between said counterbalancing arm and said support means whereby sudden movement of said arm may be damped.

* * * * *